(12) United States Patent
Izumitani et al.

(10) Patent No.: US 8,653,150 B2
(45) Date of Patent: Feb. 18, 2014

(54) METHOD FOR DECOMPOSING THERMOSET RESIN AND RECOVERING DECOMPOSITION PRODUCT

(75) Inventors: Takumi Izumitani, Moriguchi (JP); Takaharu Nakagawa, Nara (JP); Masaru Hidaka, Nara (JP); Keishi Shibata, Ibaraki (JP); Junko Matsui, Hikone (JP)

(73) Assignees: Panasonic Corporation, Osaka (JP); International Center for Environmental Technology Transfer, Mie (JP)

( * ) Notice: Subject to any disclaimer, the term of this patent is extended or adjusted under 35 U.S.C. 154(b) by 225 days.

(21) Appl. No.: 12/934,390

(22) PCT Filed: Mar. 26, 2009

(86) PCT No.: PCT/JP2009/056129
§ 371 (c)(1),
(2), (4) Date: Dec. 9, 2010

(87) PCT Pub. No.: WO2009/119742
PCT Pub. Date: Oct. 1, 2009

(65) Prior Publication Data
US 2011/0086930 A1  Apr. 14, 2011

(30) Foreign Application Priority Data

Mar. 26, 2008 (JP) ................................. 2008-081962
Apr. 24, 2008 (JP) ................................. 2008-114481

(51) Int. Cl.
*C08J 11/04* (2006.01)

(52) U.S. Cl.
USPC ............... 521/40; 521/40.5; 521/41; 521/45; 521/46; 521/47; 521/48; 521/49.8; 528/480; 528/486; 528/488; 528/489; 528/491; 528/495; 528/499

(58) Field of Classification Search
USPC ........ 521/40, 40.5, 41, 43, 44, 45, 46, 47, 48, 521/48.8, 49.8; 528/480, 481, 486, 489, 528/488, 491, 493, 494, 495, 499, 501, 528/502 R, 502 A, 502 D, 502 E, 503
See application file for complete search history.

(56) References Cited

U.S. PATENT DOCUMENTS 7,601,760 B2 * 10/2009 Hidaka et al. ................... 521/48
7,696,378 B2 *  4/2010 Hidaka et al. ................. 562/513

FOREIGN PATENT DOCUMENTS

EP         1731557         3/2005
JP       56-501205         8/1981
(Continued)

OTHER PUBLICATIONS

Office translation of Maekawa et al (JP 2006-008984).*

(Continued)

*Primary Examiner* — Frances Tischler
(74) *Attorney, Agent, or Firm* — Greenblum & Bernstein, P.L.C.

(57) ABSTRACT

The present invention relates to a method for decomposing, in the presence of subcritical water, a thermosetting resin comprising a polyester moiety and a crosslinking moiety therewith to provide a compound comprising an acid residue derived from the polyester moiety and a residue derived from the crosslinking moiety, and collecting the compound in an efficient yield, specifically, which comprises steps of:

(I) decomposing the thermosetting resin in the presence of subcritical water to provide a solid comprising a compound comprising an acid residue derived from the polyester moiety and a residue derived from the crosslinking moiety, (II) subjecting the solid to an organic solvent to dissolve the compound into the organic solvent, wherein the organic solvent has a higher solubility which can dissolve the compound than that of water, and (III) collecting, separating or isolating the compound from the organic solvent.

8 Claims, 3 Drawing Sheets

(56) References Cited

FOREIGN PATENT DOCUMENTS

| | | |
|---|---|---|
| JP | 57-4225 | 1/1982 |
| JP | 5-31000 | 2/1993 |
| JP | 6-279762 | 10/1994 |
| JP | 10-24274 | 1/1998 |
| JP | 10-67991 | 3/1998 |
| JP | 11-140224 | 5/1999 |
| JP | 2005-48051 | 2/2005 |
| JP | 2006-8984 | 1/2006 |
| JP | 2006-8985 | 1/2006 |
| JP | 2006-213873 | 8/2006 |
| JP | 2006-232934 | 9/2006 |
| JP | 2006-232942 | 9/2006 |
| JP | 2006-241380 | 9/2006 |
| JP | 2006-273958 | 10/2006 |
| JP | 2008-31412 | 2/2008 |
| JP | 2008-50491 | 3/2008 |
| WO | 81/00855 | 4/1981 |
| WO | 81/03169 | 12/1981 |
| WO | 2005/092962 | 6/2005 |

OTHER PUBLICATIONS

Search report from E.P.O. that issued with respect to patent family member European Patent Application No. 09724716.7, mail date is Jan. 2, 2012.

\* cited by examiner

METHOD FOR DECOMPOSING THERMOSET RESIN AND RECOVERING DECOMPOSITION PRODUCT

TECHNICAL FIELD

The present patent application is filed with claiming the priorities of Japanese Patent Application No. 2008-081962, which was filed on Mar. 26, 2008, and Japanese Patent Application No. 2008-114481, which was filed on Apr. 24, 2008, the entire contents of which are incorporated herein by the reference.

The present invention relates to a method for decomposing a thermosetting resin by using of subcritical water to provide decomposed products to be collected and recycled, such as styrene-fumaric acid copolymers.

BACKGROUND ART

Most of waste plastics hitherto have been dumped by reclaiming lands with the same or incinerating the same, and have never been used as useful resources. This waste disposal by way of reclaiming the lands has difficulties in the ensuring of the sites to be reclaimed, and in stable hardening of such sites. On the other hand, the disposal by way of incinerating the waste plastics has disadvantages, such as the damage to the incinerators, generation of organic gases and offensive odors, and emission of $CO_2$.

To solve these problems, the Containers and Packaging Recycling Law was instituted in 1995 in Japan, so as to obligate the recovering and recycling of plastics. This trend of recovering and recycling products containing plastics is prevailing in association with the enforcement of a variety of recycling laws.

Recently, under such circumstances, there is a trial such waste plastics are to be recycled and reused as material resources. For example, the following patent literatures 1-5 suggest methods for decomposing the plastics by using of supercritical or subcritical water, as a reaction media, in order to provide decomposed products to be collected.

Since these methods, however, randomly decompose the plastics, it is difficult to provide a certain quality of decomposed product.

In order to solve such problems, for example, the following patent literature 6 suggests a method for decomposing, with subcritical water, a thermosetting resin of a polyester composed of a polyalcohol and a polybasic acid, which has been crosslinked by a crosslinking agent, under the thermal decomposition temperature of the thermosetting resin, in order to provide monomers to be recycled as materials for newly producing a thermosetting resin as well as copolymers between the crosslinking agent and the polybasic acid, such as styrene-fumaric acid copolymers.

Patent Literature 1: JP-T-56-501205
Patent Literature 2: JP-A-57-4225
Patent Literature 3: JP-A-5-31000
Patent Literature 4: JP-A-6-279762
Patent Literature 5: JP-A-10-67991
Patent Literature 6: WO 2005/092962

DISCLOSURE OF INVENTION

Problems to be Solved by the Invention

According to the method described in the patent literature 6, a thermosetting resin can be decomposed to styrene-fumaric acid copolymers in the presence of subcritical water containing a water-soluble alkali such as potassium hydroxide and sodium hydroxide. Therefore, the decomposed products, i.e., the styrene-fumaric acid copolymers are present in the aqueous solution as salts in their dissolved forms. In case of the plastic contains an inorganic filler(s) such as calcium carbonate and aluminium hydroxide, and/or an inorganic material(s) such as a glass fiber, the plastic can be decomposed in the presence of subcritical water to provide an aqueous solution phase containing styrene-fumaric acid copolymers and a solid phase containing inorganic materials, which can be subjected to a solid-liquid separation. The aqueous solution phase is necessarily collected as a separated solution. During the separation procedure, the amount of the styrene-fumaric acid copolymers to be collected in the separated solution may be disadvantageously decreased. Subsequently, an acid is added to the separated solution to precipitate the styrene-fumaric acid copolymers which are subjected to a solid-liquid separation. The precipitates are necessarily collected as solids. During the separation procedure, the amount of the styrene-fumaric acid copolymers to be collected as solids may be disadvantageously decreased. Therefore, the method of the patent literature 6 does not provide the styrene-fumaric acid copolymers with a sufficient collection yield.

Under such circumstances, the present invention is aiming to provide a method for decomposing a thermosetting resin to give decomposed products to be collected in an efficient yield, such as a compound comprising an acid residue derived from the polyester moiety and a residue derived from the crosslinking moiety (e.g., styrene-fumaric acid copolymers) and a modified derivative thereof, both of which can be recycled, in order to solve the above-described problems.

Means for Solving Problems

The present invention includes the following preferable embodiments.

[1] A method for decomposing, in the presence of subcritical water, a thermosetting resin comprising a polyester moiety and a crosslinking moiety therewith to provide a compound comprising an acid residue derived from the polyester moiety and a residue derived from the crosslinking moiety, and collecting the compound, which comprises steps of:

(I) decomposing the thermosetting resin in the presence of subcritical water to provide a solid comprising a compound comprising an acid residue derived from the polyester moiety and a residue derived from the crosslinking moiety, (II) subjecting the solid to an organic solvent to dissolve the compound into the organic solvent, wherein the organic solvent has a higher solubility which can dissolve the compound than that of water, and (III) collecting, separating or isolating the compound from the organic solvent.

[2] The method according to the above item [1], wherein the decomposition is carried out in the presence of subcritical water substantially free of an alkali.

[3] The method according to the above item [2], wherein the thermosetting resin comprising a polyester moiety and a crosslinking moiety therewith is free of calcium carbonate.

[4] The method according to the above item [1], wherein the decomposition is carried out in the presence of subcritical water containing calcium hydroxide, and wherein the method further comprises, prior to the step (II), a step of treating, with an acid, the solid containing the compound comprising an acid residue derived from the polyester moiety and a residue derived from the crosslinking moiety.

[5] The method according to any one of the above items [1] to [4], wherein the organic solvent comprises an alcohol which is a liquid at ambient temperature, and wherein the method further comprises a step of an esterification, wherein the compound comprising an acid residue derived from the polyester moiety and a residue derived from the crosslinking moiety is esterified, with the alcohol, at the acid residue derived from the polyester moiety to allow the compound to be hydrophobic.

[6] The method according to the above item [5], wherein the alcohol comprises an alcohol having a higher boiling point than that of water.

[7] The method according to any one of the above items [1] to [4], which further comprises a step of an anhydrization, wherein the compound comprising an acid residue derived from the polyester moiety and a residue derived from the crosslinking moiety is subjected to an anhydrization at the acid residue derived from the polyester moiety to allow the compound to be hydrophobic.

[8] The method according to the above item [7], wherein the anhydrization is carried out by subjecting a carboxyl group in the compound to a dehydration with heating.

[9] The method according to the above item [7], wherein the anhydrization is carried out by a reaction of a carboxyl group in the compound comprising an acid residue derived from the polyester moiety and a residue derived from the crosslinking moiety with acetic anhydride.

[10] The method according to any one of the above item [1] to [9], wherein the solid containing the compound comprising an acid residue derived from the polyester moiety and a residue derived from the crosslinking moiety is subjected to a pressure up to 10 atm (in absolute pressure) and heating under the thermal decomposition temperature of the compound to allow the compound to be dissolved into the organic solvent.

Effects of the Invention

According to the present invention, the thermosetting resin comprising a polyester moiety and a crosslinking moiety therewith can be decomposed in the presence of subcritical water to produce a solid containing a compound comprising an acid residue derived from the polyester moiety and a residue derived from the crosslinking moiety (hereinafter, which is referred to as "Compound X"), such as a styrene-fumaric acid copolymer, to which an organic solvent is added, wherein the organic solvent has a higher solubility which can dissolve the Compound X than that of water. Compound X can be dissolved into the organic solvent, and if necessary, Compound X can be modified to be hydrophobic. Accordingly, Compound X and a modified derivative thereof (hereinafter, which is referred to as a "modified Compound X") can be collected in an efficient yield.

According to the prior arts, the decomposition of the thermosetting resin with subcritical water provides an aqueous solution of Compound X. Collection of such Compound X dissolved in water gives an insufficient collection yield due to increased loss of Compound X. Whereas, according to the present invention, the resulting solid comprising Compound X as a solid can be contacted with the organic solvent, wherein Compound X can be dissolved into the organic solvent, and then Compound X can be collected. Therefore, loss of Compound X can be decreased, and the collection yield of Compound X can be improved.

Furthermore, according to the present invention, the resulting solid comprising Compound X can be subjected to an organic solvent, wherein the organic solvent has a higher solubility which can dissolve Compound X than that of water, and Compound X can be dissolved into the organic solvent, and then Compound X can be modified with the solvent to be hydrophobic to facilitate the production of the modified Compound X.

The collected Compound X and the modified Compound X, according to the present invention, can be recycled as materials to produce resins, as shrinkage inhibitors, such as materials to produce a formed article of an unsaturated polyester resin.

BEST MODE FOR CARRYING OUT THE INVENTION

Figure 1:
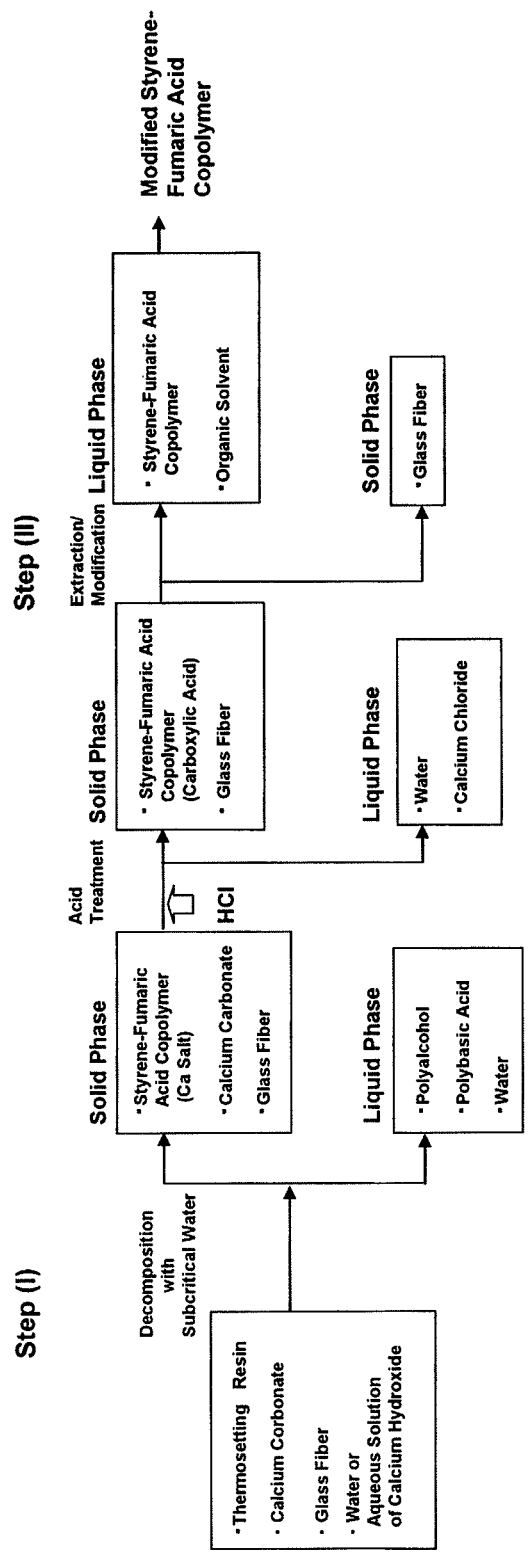
FIG. 1 is a flowchart showing steps in order in a preferable embodiment according to the method of the present invention.

The subjective thermosetting resins to be decomposed according to the present invention include crosslinked polyester resins, which are obtainable by crosslinking of any polyesters, and furthermore which comprises a polyester moiety and a crosslinking moiety therewith. Such thermosetting resins include cured products (or formed articles).

The polyester moiety is derived from a polyester prepared by a polycondensation of a polyalcohol and a polybasic acid. Therefore, such polyester comprises a polyalcohol residue and a polybasic acid residue, both of which are attached together via an ester bond. The polyester moiety can comprise a double bond(s) which is/are contained in the starting unsaturated polybasic acid.

The crosslinking moiety bridges the above-described polyester moieties. For example, the crosslinking moiety can be derived from any crosslinking agent, and which is not particularly limited. The crosslinking moiety can be derived from a single crosslinking agent or a plurality of crosslinking agents which are polymerized to form an oligomer or a polymer. It is not particularly limited to wherein the crosslinking moiety and the polyester moiety are bonded together or how they are attached to each other.

Therefore, the wording of the "thermosetting resin comprising a polyester moiety and a crosslinking moiety therewith" means a thermosetting resin comprising a polyester essentially composed of a polyalcohol and a polybasic acid, which has been crosslinked, or networked, via a crosslinking moiety (i.e., networked polyester resin). The thermosetting resin includes any resins exerting the above-described effects, which can be applied to the present invention. Therefore, there are no limitations on type of the resin, structure of the resin, type of the crosslinking moiety (or crosslinking agent), amount thereof, and degree of crosslinking, etc.

The thermosetting resins which can be applied to the present invention have been predominantly cured (or crosslinked) by means of heating, etc. The thermosetting resins may be uncured or partially cured resins, which can be sufficiently cured (or crosslinked) by means of further heating or the like, and which can be applied to the present invention in order to exert the above-described effects.

The preferable thermosetting resin to be applied to the present invention includes an unsaturated polyester derived from a polyalcohol and an unsaturated polybasic acid, which has been crosslinked by means of a crosslinking agent to be formed into a networked polyester resin.

The starting polyalcohol to form the polyester moiety includes, for example, a glycol such as ethylene glycol, propylene glycol, neopentyl glycol, diethylene glycol and dipropylene glycol, etc. A single polyalcohol can be used alone. Alternatively, two or more polyalcohols can be used in any combination.

The starting polybasic acid to form the polyester moiety includes, for example, an aliphatic unsaturated dibasic acid such as maleic anhydride, maleic acid, fumaric acid, etc. A single polybasic acid can be used alone. Alternatively, two or more polybasic acids can be used in any combination. A saturated polybasic acid such as phthalic anhydride can be used in any combination with an unsaturated polybasic acid(s).

The crosslinking agent can crosslink with any polyester which is a copolymer of the polyalcohol and the polybasic acid. The crosslinking agent includes styrene which is an essential component. The other crosslinking agent such as polymerizable vinyl monomer (e.g., methyl methacrylate) can be used in a combination with the above-described crosslinking agent.

Herein, according to the present invention, the thermosetting resin composition can also be decomposed with subcritical water, wherein the thermosetting resin composition comprises the above-described thermosetting resin, and an inorganic material such as inorganic filler (e.g., calcium carbonate, aluminum hydroxide); a reinforcing fiber such as a glass fiber (e.g., chopped strand which is produced by cutting a roving), a carbon fiber; and any other component. Such thermosetting resin composition is also an subject to be decomposed according to the present invention.

The present invention comprises steps (I), (II) and (III), which are described below in detail, wherein the thermosetting resin can be decomposed to products, which can be recycled, such as a compound comprising an acid residue derived from the polyester moiety and a residue derived from the crosslinking moiety (i.e., Compound X) and/or a modified derivative thereof (i.e., modified Compound X), both of which can be collected.

For example, in case of that the thermosetting resin is prepared by using of fumaric acid (or maleic acid) as a polybasic acid and styrene as a crosslinking agent, as Compound X or the modified Compound X, a styrene-fumaric acid copolymer or a modified styrene-fumaric acid copolymer can be collected.

Firstly, a thermosetting resin comprising a polyester moiety and a crosslinking moiety therewith is subjected to a decomposition in the presence of subcritical water (Step (I)). Herein, the thermosetting resin may comprise an inorganic filler such as calcium carbonate; a reinforcing fiber such as a glass fiber, a carbon fiber; and any other component, which is described above.

The decomposition with subcritical water can provide Compound X as a decomposed product of a water-insoluble salt. Therefore, it is preferable to employ water substantially free of an alkali.

The wording of "substantially free of an alkali", as used herein, means an amount no more than at least catalytic amount of an alkali such as an alkali metal hydroxide (e.g., sodium hydroxide, potassium hydroxide), which can catalyze the decomposition. Therefore, under these conditions, Compound X resulted from the decomposition is wholly present as an insoluble salt in water, which salt is not dissolved into water. Accordingly, in this context, there may be an extremely slight amount of an alkali due to the thermosetting resin, which may be eluted.

The decomposition with subcritical water substantially free of an alkali can provide Compound X in a form of a water-insoluble salt having a carboxylic group, wherein the moiety derived from fumaric acid of Compound X has the carboxylic group (i.e., Compound X is present as a carboxylic acid).

It is preferable in the decomposition with subcritical water to employ water containing an inorganic compound comprising hydroxyl groups, preferably which has at least 2 valences.

The "inorganic compound comprising hydroxyl groups", as used herein, means a compound catalyzing the decomposition, i.e., a decomposition catalyst, to produce Compound X in a form of a salt, as a solid, at its carboxyl group, which is not dissolved in water. In other words, the "inorganic compound comprising hydroxyl groups" is a compound which can react with a carboxyl group of the Compound X to produce a water-insoluble substance. Therefore, it is not concerned with the solubility of the inorganic compound comprising hydroxyl groups itself to water. The inorganic compound comprising hydroxyl groups needs to have 2, 3 or more valences. The inorganic compound includes a compound having up to 4 valences (e.g., Sn compounds) wherein the valence is counted on the atom or ion. Preferable examples of such inorganic compound include hydroxides of alkali earth metals (which have 2 valences) such as calcium hydroxide, barium hydroxide, strontium hydroxide, etc.

For example, in case of that calcium hydroxide is employed, 2 carboxyl groups of Compound X can form a ring via the Ca atom. In another embodiment, as it is shown in the appended FIG. 3 (a), which is also described hereinafter, one carboxyl group of one Compound X can form a linkage (ring), via the Ca atom, together with another carboxyl group of another Compound X. Therefore, it is difficult to dissolve Compound X into water in such state. The amount of the inorganic compound comprising hydroxyl groups to be added can be a stoichiometric or more, preferably two molar equivalents or more relative to theoretical mole number of the acid residue(s) of Compound X resulted from the thermosetting resin after the decomposition. Such amount can accelerate the decomposition with subcritical water, or hydrolysis, of the resin to decrease in the temperature and time during the decomposition.

The decomposition of the thermosetting resin with subcritical water is carried out under such conditions that water is added to the thermosetting resin, wherein, for example, water is substantially free of an alkali and/or water contains an inorganic compound comprising hydroxyl groups, which has at least two valences (e.g., calcium hydroxide), and wherein water is reached to a subcritical state at an elevated temperature and an elevated pressure to decompose the thermosetting resin. The amount of water to be added to the thermosetting resin is within a preferable range of from 200 to 500 parts by weight relative to 100 parts by weight of the thermosetting resin.

Generally, decomposition of plastics with subcritical water is caused by a thermal decomposition and/or hydrolysis reaction. It is also applied to the thermosetting plastics prepared with polyalcohol(s) and polybasic acid(s) as starting materials. During the decomposition of the thermosetting plastics, hydrolysis reaction predominantly proceeds. Selective hydrolysis reaction proceeds, under conditions wherein temperature and/or pressure of subcritical water is/are appropriately determined. The decomposition of the thermosetting plastics produces monomers such as polyalcohols and polybasic acids, and oligomer(s) thereof wherein several monomers are linked together.

Therefore, according to the present invention, the above-described thermosetting resin to be decomposed can be contacted with subcritical water to produce monomers such as a polyalcohol(s) and a polybasic acid(s) and an oligomer(s) such as Compound X, all of which can be collected and then recycled to produce plastic material(s).

The term "subcritical water", as used herein, means water in a state of that the temperature is no less than 140° C. and no more than the critical temperature of water (i.e., 374.4° C.) and at a pressure of 0.36 MPa (i.e., saturated vapor pressure at 140° C.) or more. Herein, ion product of the subcritical water is about 100 to about 1000 multiple that of water at ambient temperature and ambient pressure. Subcritical water has a decreased dielectric constant equal to those of organic solvents. Subcritical water has an improved wettability to the surface of the thermosetting resin. Subcritical water has these effects accelerating the hydrolysis of the thermosetting resin, which enables to decompose the thermosetting resin to the monomer(s) and/or the oligomer(s) thereof.

According to the present invention, temperature of the subcritical water during the decomposition reaction is less than the thermal decomposition temperature of the subjective thermosetting resin to be decomposed, preferably at a temperature producing the decomposed polyalcohol(s) as a monomer(s), and more preferably within a range of from 180 to 300° C. When the temperature during the decomposition reaction is less than 180° C., the cost for the decomposing treatment may be increased, since it takes much time to decompose the resin. In this case, yield of Compound X tends to be decreased. When the temperature during the decomposition reaction is more than 300° C., the resulting Compound X can be significantly and thermally decomposed to various low-molecular weight derivatives thereof such as styrene derivatives. In this case, it tends to be difficult to collect Compound X itself.

Time for the decomposing treatment with subcritical water varies and depends on the treating conditions such as reaction temperature. It is generally within a range of from 1 to 8 hours. Pressure applied to the decomposition reaction system varies and depends on the conditions such as reaction temperature. It is preferably within a range of from 2 to 15 MPa.

As described above, the decomposition of the thermosetting resin produces Compound X. Thus resulted Compound X after such decomposition reaction is precipitated as a water-insoluble material. The other materials contained in the thermosetting resin such as inorganic materials (e.g., calcium carbonate, a glass fiber) and the like can be collected, together with the undecomposed thermosetting resin, in a solid (or a solid phase). Herein, the monomers resulted from the decomposition reaction, such as monomers derived from polyester moiety, i.e., a polyalcohol(s) and a polybasic acid(s), can be present as a water-soluble component(s) (in a liquid phase), which can be separated off from the solid (or the solid phase) such as the water-insoluble salt of Compound X, etc.

The decomposed products can be subjected to a solid-liquid separation to provide the solid (or the solid phase) containing Compound X which is produced in the decomposition reaction, which can be collected.

Specifically, a reaction vessel containing subcritical water and the decomposed products is cooled. Subsequently, the contents of the vessel are subjected to a solid-liquid separation by means of a method such as a filtration under a reduced pressure, a pressure filtration, a filter press, etc. The solid-liquid separation can provide Compound X as a solid (or in a solid phase), together with the inorganic materials contained in the thermosetting resin (e.g., calcium carbonate and a glass fiber) and undecomposed thermosetting resin, all of which can be separated off.

Herein, the aqueous solution wherein the monomers such as a polyalcohol(s) and a polybasic acid(s) are dissolved can be separated off as a liquid (or a liquid phase). The separated liquid (phase) containing the polyalcohol(s) and the polybasic acid(s), as it is, can be employed and recycled as subcritical water to decompose a further thermosetting resin. In case of that the separated liquid containing the polyalcohol(s) and the polybasic acid(s) is repeatedly recycled, the resulting polyalcohol(s) and the polybasic acid(s) after the repeated decomposition reactions can be further dissolved into the aqueous solution. Therefore, it is possible to increase in the concentrations of the polyalcohol(s) and the polybasic acid(s), which can be collected in their high concentrations.

Subsequently, for example, aerated water (i.e., water containing carbonic acid gas) can be added to the solid obtained in the step (I) to dissolve calcium carbonate in the solid into water. The solid containing Compound X as a salt of a carboxylic acid can be collected by this procedure (i.e., aerated water treatment).

Specifically, the solid containing Compound X and the inorganic materials, such as calcium carbonate and a glass fiber as a mixture is added to a container together with water. The container is closed. Carbonic acid gas ($CO_2$) can be introduced into the container to dissolve calcium carbonate into water as calcium hydrogencarbonate. Subsequently, the container is opened. The contents of the container are subjected to a solid-liquid separation, for example, by means of a method such as a filtration. The solid-liquid separation can provide a solid containing the glass fiber and Compound X as a salt of a carboxylic acid as well as water containing calcium hydrogencarbonate resulted from the dissolution of calcium carbonate, each of which can be separated. The calcium hydrogencarbonate-containing water can be heated to separate off the resulting carbon dioxide ($CO_2$). The calcium carbonate resulted and precipitated under the heating can be separated off from water. The resulted calcium carbonate can be recycled as an inorganic filler again. The resulted carbon dioxide and water can be recycled as aerated water in the above-described aerated water treatment again.

Herein, in case of that the thermosetting resin comprising calcium carbonate is subjected to the decomposition with subcritical water which may comprise an inorganic compound comprising hydroxyl groups, which has at least 2 valences, such as calcium hydroxide, the resulting solid contains an inorganic material such as a compound containing a metal having polyvalence (e.g., calcium compounds, etc.), such as calcium carbonate resulted from the thermosetting resin, an inorganic compound comprising hydroxyl groups, which has at least 2 valences (e.g., a hydroxide of an alkaline earth metal having 2 valences such as calcium hydroxide), and which can be dissolved into subcritical water, an inorganic compound derived therefrom, etc. It is preferable that the compound such as the compound containing a metal having a polyvalence is dissolved into water in order to provide a solid comprising Compound X, which can be collected, in a high purity.

The above-described aerated water treatment can dissolve such compounds into water, which comprises a metal having a polyvalence in the solid, particularly, a hydroxide of an alkaline earth metal having 2 valences such as calcium carbonate, calcium hydroxide, etc. For example, calcium carbonate and calcium hydroxide can be dissolved into water by the above-described aerated water treatment as follows.

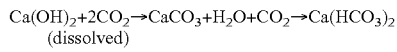
(dissolved)

Herein, in the step (I), in case of that the thermosetting resin does not comprise calcium carbonate, the decomposition of such thermosetting resin with subcritical water free of any inorganic compound comprising hydroxyl groups, which has at least 2 valences, excludes the above-described aerated water treatment and any acid treatment which is hereinafter described in detail. In such case, a water-insoluble Compound X is produced as it is shown in the appended FIG. 3 (b) which is hereinafter described in detail. Such water-insoluble Compound X excludes the removal of the compound such as the compound containing a metal having a polyvalence.

A acid such as hydrochloric acid can be added to the solid obtained in the step (I) or the solid obtained after the aerated water treatment in order to dissolve the above-described compound comprising a metal having a polyvalence (e.g., a hydroxide of an alkaline earth metal such as calcium carbonate and calcium hydroxide) and the like into water. Simultaneously, Compound X in a form of a salt of a carboxylic acid can be formed into Compound X itself, i.e., in a form of a carboxylic acid.

Figure 3:
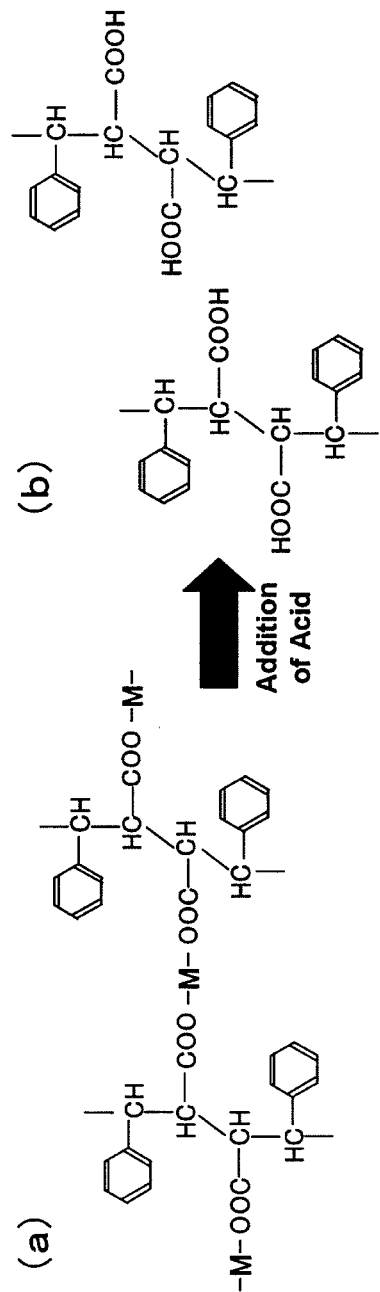
FIG. 3 is showing a salt of a styrene-fumaric acid copolymer at its carboxyl group, and a state of the styrene-fumaric acid copolymer after addition of an acid.

As it is shown in the appended FIG. 3(a), Compound X in a form of a salt of a carboxylic acid in the solid obtained in the step (I) or the solid obtained after the aerated water treatment comprises a residue derived from the crosslinking moiety (see the styrene-based structure in FIG. 3) and an acid residue derived from the polyester moiety (see the fumaric acid-based structure in FIG. 3). The carboxyl group of the acid residue is linked via a metal M (wherein M is a metal such as calcium derived from the thermosetting resin or the inorganic compound comprising hydroxyl groups) to form a moiety: —COO-M-OOC—.

Compound X in a form of a salt of a carboxylic acid has insolubility to water and a poor solubility to the solvents described below. Herein, as it is shown in the attached FIG. 3(b), an acid such as hydrochloric acid can be added to Compound X in a form of a salt of a carboxylic acid to cleavage the moiety linked via metal M having at least 2 valences: —COO-M-OOC— to leave Compound X which can be dissolved into the solvent.

The acid which can be used in the above-described acid treatment includes an acid which can transform a Compound X in a form of a salt of a carboxylic acid to a Compound X which can be dissolved into the organic solvent which is described hereinafter in detail. It is preferable that the acid can dissolve the above-described compounds such as the compound containing a metal having a polyvalence into water in addition to the Compound X in a form of a salt of a carboxylic acid. Examples of the acid include hydrochloric acid, nitric acid, etc.

In the above-described acid treatment, concentration of the acid and amount of the acid to be added can be, but not particularly limited to, no less than the amount which can cause the cleavage of the linkage in order to leave the Compound X as a carboxylic acid, and, in addition to that, preferably no less than the amount which can dissolve the compound containing a metal having a polyvalence, or the like, into water. In case of that the acid is hydrochloric acid such as a concentrated (e.g., about 35%) hydrochloric acid solution, it is preferable to use 70 to 150 parts by weight of the concentrated hydrochloric acid solution relative to 100 parts by weight of Compound X. It is also preferable to use 300 to 450 parts by weight of the concentrated hydrochloric acid solution relative to 100 parts by weight of the compound containing a metal having a polyvalence (e.g., calcium carbonate, calcium hydroxide, etc.). Accordingly, in case of that the amount of Compound X is in 100 parts by weight and the amount of the compound containing a metal having a polyvalence is in 100 parts by weight, total amount of the concentrated hydrochloric acid solution is within a range of from 370 to 600 parts by weight. From the aspect of the workability, it is preferable that the acid is diluted with water to reach to the concentration wherein the solid is immersed therein. In this case, it is not preferable that excessive dilution gives much waste water.

In such addition of acid in the above-described acid treatment, a given amount of the acid (solution) can be added to the solid. Alternatively, the solid can be immersed into a given amount of the acid (solution).

The filtrate (or the aqueous solution) separated after the above-described acid treatment can be recycled, which can be employed again as an acid to be used in the acid treatment and/or as water to dilute an acid to be added to the solid in order to transform Compound X in a form of a salt of a carboxylic acid to Compound X itself, i.e., in a form of a carboxylic acid. In case of that the concentration of the salts dissolved therein are increased after such repeatable recycling, water is evaporated off and then collected to left the salts which can be collected. The collected water can be recycled.

In the step (I), in case of that the thermosetting resin free of calcium carbonate as the inorganic material is subjected to the decomposition with subcritical water free of any inorganic compound comprising hydroxyl groups, it is excluded to remove calcium carbonate and the inorganic compound comprising hydroxyl groups. As it is shown in the FIG. 3(b), the water-insoluble Compound X is generated, which is not in a form of a salt of a carboxylic acid. Therefore, both of the above-described aerated water treatment and the above-described acid treatment can be excluded.

Subsequently, the solid obtained after the above-described step (I), the above-described aerated water treatment or the above-described acid treatment is subjected to an organic solvent to dissolve Compound X into the organic solvent, wherein the organic solvent has a higher solubility which can dissolve Compound X than that of water (Step (II)). Step (II) can separate Compound X from the other materials contained in the solid, such as the inorganic materials. According to the present invention, Compound X can be further modified to a modified Compound X.

Specifically, in the step (II), an organic solvent having a higher solubility which can dissolve Compound X than that of water is added to the solid obtained after the above-described solid-liquid separation. The amount of the organic solvent to be added is within a range of from 2 to 20 parts by weight relative to 1 part of weight of Compound X as a basis of theoretical weight of Compound X to be eluted or extracted out. The mixture is stirred for about 30 minutes or more, preferably for about 2 to about 20 hours to dissolve the Compound X of the solid into the organic solvent. Prior to the step (II), calcium carbonate which may be contained in the thermosetting resin is previously removed off. Therefore, in the step (II), calcium carbonate does not adversely interfere with the elution/extraction of compound X into the organic solvent due to the strong association of calcium carbonate with the Compound X. Therefore, Compound X can be effectively eluted or extracted with the organic solvent.

The "theoretical weight of Compound X", as used herein, means a calculated weight based on a ratio of molar number of acid residues derived from the polyester moiety to a molar number of residues derived from the crosslinking moiety (i.e., in a molar ratio thereof) which numbers are found in a NMR analysis of Compound X obtained after the decomposition, as well as, weight of the employed crosslinking moiety-forming material (e.g., a vinyl monomer such as styrene).

Specifically, the "theoretical weight of Compound X" can be calculated as follows.

NMR analysis on one Compound X resulted from the decomposition of the thermosetting resin can find the structure of the Compound X. Based on the found structure of the Compound X, in the Compound X, the molar ratio of the "acid residues" derived from the polyester moiety to the "residues derived from the crosslinking moiety" can be calculated, wherein the "residues derived from the crosslinking moiety" are originated from the crosslinking moiety-forming material (e.g., a vinyl monomer such as styrene).

Subsequently, based on this calculated value (i.e., the calculated molar ratio) and the weight of the employed crosslinking moiety-forming material to form the crosslinking moiety of the thermosetting resin, the weight of Compound X can be calculated.

For example, in case of that the thermosetting resin comprises maleic acid as a polybasic acid to form the polyester moiety, and styrene as the crosslinking moiety-forming material, such thermosetting resin is decomposed to produce Compound X, wherein the ratio of the fumaric acid residues to the styrene residues is 1:2, which can be found in NMR structure analysis. Herein, the amount of the employed styrene to form the crosslinking moiety of the thermosetting resin is 100 parts by weight. Molecular weight of styrene is 104 and molecular weight of maleic acid is 116. Therefore, the theoretical weight of Compound X can be calculated as follows:

Theoretical weight of Compound $X=100+116\times(100/104)\times(1/2)=155.8$

Accordingly, the theoretical weight of Compound X to be present in such thermosetting resin is 155.8 parts by weight.

Furthermore, in the step (II), in order to dissolve Compound X into the organic solvent, the solid can be subjected to a pressure up to 10 atm (in absolute pressure) and heating under the thermal decomposition temperature of Compound X to allow Compound X to be dissolved into the organic solvent. Herein, a thermosetting resin is decomposed with subcritical water at 280° C. which is less than the thermal decomposition temperature of the thermosetting resin, and then thus treated thermosetting resin is analyzed by NMR structure analysis. It can be found and confirmed that a decarboxylation can proceed on a carboxyl group on Compound X. Therefore, it can be further accelerated that the Compound X can be modified to be hydrophobic, in addition to the effective dissolution of Compound X into the organic solvent and then collection of the Compound X in an improved yield.

The organic solvent having a higher solubility which can dissolve Compound X than that of water, which can be employed in the step (II), includes, but is not particularly limited to, the organic solvent which can dissolve the Compound X of the solid produced by the decomposition of the thermosetting resin. The examples of the organic solvent include an organic solvent which is a liquid at an ambient temperature (i.e., 20±15° C.), preferably an organic solvent which can dissolve no less than 50% by weight of Compound X, at an ambient temperature (i.e., 20±15° C.), relative to the weight of a mixture comprising the Compound X and the organic solvent in a ratio of 1/4 (=Compound X/organic solvent). Specifically, preferable examples of the organic solvent include an organic solvent having a low polarity such as chloroform and THF as well as an amphiphilic organic solvent such as acetone. The further examples of the organic solvent include an alcohol which is a liquid at an ambient temperature (i.e., 20±15° C.), which is described in detail hereinafter, and an acid anhydride such as acetic anhydride.

It is desirable, as the organic solvent, to use an alcohol which is a liquid at an ambient temperature (i.e., 20±15° C.) in order to realize omission of many procedures. Use of such alcohol as the organic solvent can facilitate the dissolution of Compound X into the alcohol and then collection of Compound X therefrom. Simultaneously, Compound X can be modified with the alcohol to be hydrophobic, wherein any carboxyl group at the terminal of the Compound X can react with the hydroxyl (OH) group of the alcohol to produce an ester (i.e., condensation reaction accompanied with dehydration).

The amount of the alcohol to be used in the esterification is, but not particularly limited to, for example, 2 times or more, and preferably within a range of from 4 to 20 times, as a basis of weight, relative to the theoretical weight of Compound X (which is described above). The reaction temperature is at a temperature of no more than the boiling point of the solvent, preferably at a temperature of immediately below the boiling point of the solvent (i.e., about boiling point). The reaction time is, not particularly limited to, for example, 2 hours or more, and preferably within a range of from 8 to 18 hours.

It is further preferable that this step is carried out at ambient pressure. When this step is carried out under an elevated pressure, flammability and ignition ability of the solvent are increased, and therefore, risks of fire and explosion are increased.

Preferable examples of the alcohol includes monoalcohols such as methanol, ethanol, propanol, butanol, pentanol, hexanol, heptanol, octanol and nonanol. Particularly preferable alcohols are higher alcohols having no less than 4 carbon atoms, preferably 6 to 8 carbon atoms.

In this case, water generated by the esterification can be removed by heating at 100° C. or more. Such heating can facilitate the dissolution of Compound X. Furthermore, evaporation and removal of water can effectively accelerate the condensation reaction accompanied with dehydration.

Herein, the organic solvent includes an acid anhydride such as acetic anhydride. For example, it is desirable, as the acid anhydride, to use acetic anhydride in order to realize omission of many procedures, which is similar to the case of the use of the alcohol. Use of acetic anhydride as the acid anhydride can facilitate the dissolution of Compound X into the acetic anhydride and then collection of Compound X therefrom. Simultaneously, Compound X can be modified with the acetic anhydride to be hydrophobic, wherein any carboxyl group at the terminal of the Compound X can react with the acetic anhydride to produce an anhydride thereof. The amount of the acid anhydride to be used to form the anhydride of Compound X is, but not particularly limited to, for example, 2 times or more, and preferably within a range of from 4 to 20 times, as a basis of weight, relative to the theoretical weight of Compound X (which is described above). The reaction temperature is not particularly limited to, for example, within a range of from 20 to 140° C., preferably within a range of from 60 to 120° C. The reaction time is not particularly limited to, for example, 2 hours or more, and preferably within a range of from 4 to 20 hours.

Scheme of the reaction between Compound X and acetic anhydride is shown below, wherein the Compound X is a styrene-fumaric acid copolymer.

Scheme 1

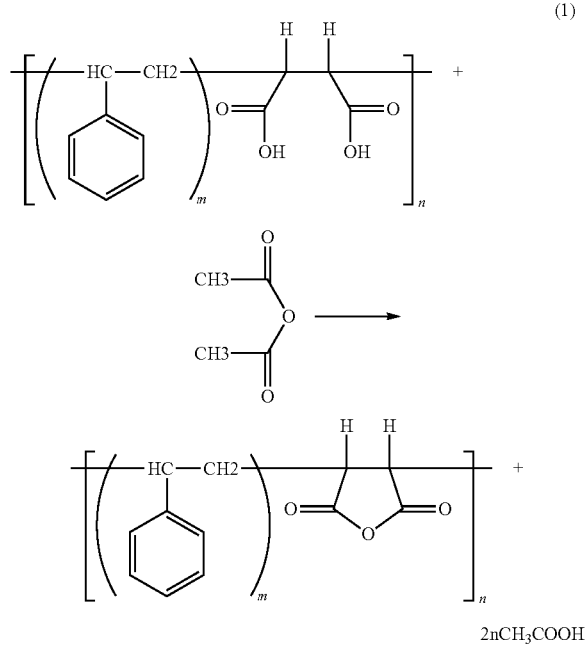

In this scheme, m is 1 to 3, and n is 3 to 300. The terminals are generally hydrogen atoms.

In addition to the acetic anhydride, the Examples of the acid anhydride include succinic anhydride, maleic anhydride, benzoic anhydride, etc. Acetic anhydride is preferable to which Compound X has an appropriate solubility.

Herein, Compound X can be modified to be hydrophobic by a dehydration with heating. The organic solvent to be used herein includes chloroform, THF, acetone, etc. The heating temperature is within a range of from 100 to 250° C., which depends on the boiling point of the organic solvent. The heating is carried out under an inert atmosphere to avoid thermal degradation. The heating causes a condensation reaction on any carboxylic group of the acid residue of the Compound X (e.g., fumaric acid residue) to modify the Compound X to be an anhydride thereof, wherein two carboxylic groups on the Compound X may be subjected to the condensation reaction to form an anhydride thereof, to which it is not limited. Thus modified Compound X having such hydrophobicity can be obtained. The dehydration with heating on the Compound X is shown in the following scheme, wherein Compound X is a styrene-fumaric acid copolymer.

Scheme 2

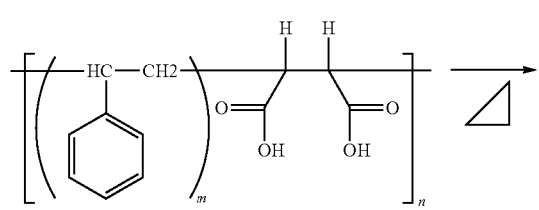

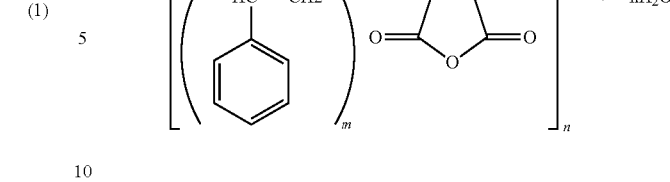

In this scheme, m is 1 to 3, and n is 3 to 300. The terminals are generally hydrogen atoms.

Herein, a hydrophobic organic solvent having a higher solubility, which can dissolve Compound X, than that of water (hereinafter, which is abbreviated and referred to as "hydrophobic solvent") can be added to a mixture of the solid (phase) containing Compound X before any solid-liquid separation, and the liquid phase which may contain water, an acid, an inorganic salt, etc. The mixture can be heated to dissolve the Compound X contained in the solid into the hydrophobic solvent, from which the Compound X can be collected. Therefore, the use of the hydrophobic solvent can omit the solid-liquid separation step on the mixture. Specifically, the hydrophobic solvent can be added to the mixture containing the solid phase and the liquid phase, in an amount of two times or more, as a basis of weight, relative to the theoretical weight of Compound X (which is described above). The mixture can be heated to a temperature that water is not evaporated, for example, within a range of from 50 to 90° C. Under such conditions, the Compound X can be dissolved into the hydrophobic solvent. Therefore, the mixture can be separated to the water phase and the hydrophobic solvent phase wherein Compound X is dissolved. Subsequently, the hydrophobic solvent phase containing dissolved Compound X therein can be separated off, and then the Compound X can be isolated from the hydrophobic solvent phase.

The hydrophobic solvent which can be used in the above-described procedure includes a solvent having a solubility to water, which is no more than 10 g/100 ml of water (at 25° C.). Among the above-described organic solvents having higher solubilities which can dissolve Compound X than that of water, the organic solvents such as octanol and chloroform can be used as the hydrophobic solvent.

When the hydrophobic solvent such as an alcohol (e.g., octanol) is used, the resulting hydrophobic solvent phase containing Compound X can be heated to a temperature no more than the boiling point of the hydrophobic solvent, for example, in case of the alcohol is octanol, for example, within a range of from 100° C. to 195° C., preferably within a range of from 150° C. to 195° C. to produce an esterified Compound X (such as octyl-esterified product). Use of the other alcohol can also produce the other esterified product. Alternatively, the resulting hydrophobic solvent phase containing Compound X can be heated to a temperature no less than the boiling point of the hydrophobic solvent to produce the Compound X esterified with the hydrophobic solvent, wherein the other excessive hydrophobic solvent are removed off, and then the esterified Compound X can be collected as a solid.

The esterified Compound X such as octyl-esterified product can be recycled and used as an alternate of a polystyrene. The esterified Compound X such as octyl-esterified product has similar properties to those of the polystyrene, although their structures are different each other. Herein, the removed hydrophobic solvent can be recycled and used in the same procedure as the hydrophobic solvent.

In the above-described procedure, the hydrophobic solvent phase, wherein Compound X is dissolved, can be removed off, and therefore, the resulting water phase and the solid phase comprising a glass fiber and the like can be separated by means of a method such as a filtration to obtain the solid phase. When the resulting filtrate comprises an acid, the filtrate can be recycled and applied to the above-described acid treatment again. Herein, while it is repeatedly recycled, the concentration of the salts dissolved therein may be increased. When the concentrations of the salts are excessively increased, water can be evaporated off to left the salts, which can be collected. The evaporated water can be recycled.

Subsequently, the Compound X or the modified Compound X dissolved in the organic solvent can be collected, separated or isolated (Step (III)). Herein, the Compound X or the modified Compound X dissolved in the organic solvent can be subjected to a solid-liquid separation, such as a filtration under a reduced pressure, a pressure filtration or a filter press, to be separated off from the inorganic material, such as a glass fiber in the solid, and from the undecomposed thermosetting resin. Subsequently, the organic solvent in the liquid phase can be removed off, for example, by evaporation to left the Compound X or the modified Compound X, which can be collected.

Simultaneously, heating of the organic solvent to a temperature within a range of from 100 to 250° C. can provide an anhydrous Compound X by the above-described dehydration with heating. Herein, the organic solvent can be also removed off to left such modified Compound X, which can be collected.

As described above, thus obtained modified Compound X can be recycled as a shrinkage inhibitor which can be used, for example, in a molding of an unsaturated polyester resin.

One of Preferable Embodiments of the Present Invention (Represented in FIG. 1)

One of the preferable embodiments of the present invention is described in detail hereinafter in order of the procedures therein with referring to the flowchart shown in FIG. 1. This embodiment of the present invention includes a method for producing a modified styrene-fumaric acid copolymer from a thermosetting resin which is obtainable from a polybasic acid (e.g., fumaric acid, maleic acid) and a crosslinking agent such as styrene.

At a first step, a thermosetting resin-containing composition is subjected to the decomposition with subcritical water (Step (I)), wherein the thermosetting resin-containing composition comprises a thermosetting resin comprising a polyester moiety and a crosslinking moiety therewith, calcium carbonate, and a glass fiber. Herein, the decomposition with subcritical water is carried out in the presence of water substantially free of an alkali, or in the presence of an aqueous solution comprising calcium hydroxide.

In this embodiment of the present invention, the styrene-fumaric acid copolymer resulted from the decomposition with subcritical water is present in a form of a calcium (Ca) salt (which is a water-insoluble salt), since the thermosetting resin-containing composition comprises calcium carbonate.

In case of the use of the aqueous solution comprising calcium hydroxide rather than the use of the water substantially free of an alkali, the resulting styrene-fumaric acid copolymer after the decomposition may be in a form of a calcium (Ca) salt (which has a poor water-solubility) (see FIG. 3(a)), wherein two carboxyl groups on a fumaric acid residue of a styrene-fumaric acid copolymer can from a linkage (or a ring) via a Ca atom, or one of two carboxyl groups on a fumaric acid residue of one styrene-fumaric acid copolymer can be linked with, via a Ca atom, one of two carboxylic groups on a fumaric acid residue of the other styrene-fumaric acid copolymer to form a linkage (or a ring).

Such decomposition of the thermosetting resin with subcritical water produces such styrene-fumaric acid copolymer in a form of a water-insoluble component, which is precipitated. Therefore, the styrene-fumaric acid copolymer can be separated as a solid (phase) together with inorganic materials, such as calcium carbonate and glass fiber, which are originally contained in the thermosetting resin as well as undecomposed thermosetting resin. Furthermore, after the decomposition, the resulted monomers derived from the polyester moiety of the thermosetting resin, such as a polyalcohol and a polybasic acid, are water-soluble components, and therefore, these monomers are in the liquid phase, which can be separated off from the solid (phase) comprising the styrene-fumaric acid copolymer, etc.

In this embodiment of the present invention, in case of that the thermosetting resin-containing composition comprises calcium carbonate, the decomposition of the composition with subcritical water provides a solid comprising calcium carbonate as an inorganic material, which can be collected. An acid treatment is carried out wherein an acid such as hydrochloric acid is contacted with the resulted solid to transform the calcium carbonate to calcium chloride which can be dissolved into water. The resulting mixture after the acid treatment is subjected to a solid-liquid separation to separate off the solid free of calcium carbonate. Such acid treatment can provide a styrene-fumaric acid copolymer in a form of a water-insoluble salt (or a styrene-fumaric acid copolymer as a carboxylic acid), wherein the styrene-fumaric acid copolymer in a form of a calcium (Ca) salt in the solid resulted from the decomposition with subcritical water is transformed into a carboxylic acid at the fumaric acid residue of the copolymer. Thus resulted water-insoluble salt (or the styrene-fumaric acid copolymer as a carboxylic acid) can be modified in the following step (II) to produce a modified styrene-fumaric acid copolymer.

Subsequently, the step (II) comprises a step of subjecting the resulted solid to an organic solvent to dissolve the styrene-fumaric acid copolymer into the organic solvent, wherein the organic solvent has a higher solubility which can dissolve the styrene-fumaric acid copolymer than that of water. Herein, the organic solvent can dissolve and/or modify (e.g., esterify, anhydrize) the styrene-fumaric acid copolymer, and acilitate to allow the copolymer to be hydrophobic.

Herein, the styrene-fumaric acid copolymer can be dissolved into the organic solvent. The dissolved styrene-fumaric acid copolymer is subjected to a solid-liquid separation. The styrene-fumaric acid copolymer contained in the liquid phase can be modified to be hydrophobic. The organic solvent is removed off to left the modified styrene-fumaric acid copolymer having hydrophobicity, which can be isolated.

Figure 2:
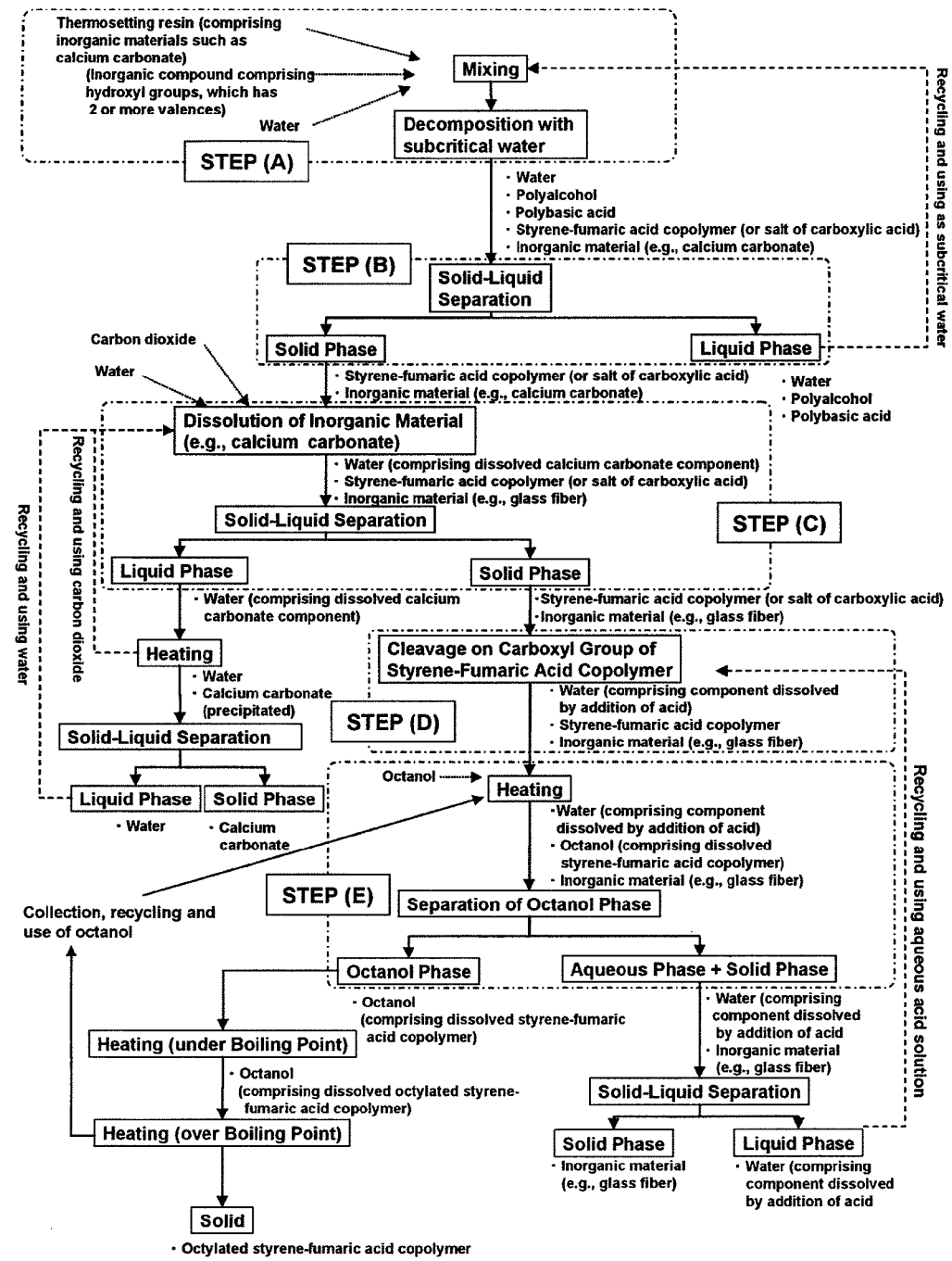
FIG. 2 is a flowchart showing steps in order in another preferable embodiment according to the method of the present invention.

Another Preferable Embodiment of the Present Invention (Represented in FIG. 2)

Another preferable embodiment of the present invention is described in detail hereinafter in order of the procedures therein with referring to the flowchart shown in FIG. 2. This embodiment of the present invention includes a method for producing a modified styrene-fumaric acid copolymer from a thermosetting resin which is obtainable from a polybasic acid (e.g., fumaric acid, maleic acid) and a crosslinking agent such as styrene.

At a first step, a thermosetting resin-containing composition is subjected to the decomposition with subcritical water (Step (A)), wherein the thermosetting resin-containing composition comprises a thermosetting resin comprising a polyester moiety and a crosslinking moiety therewith, and inorganic materials such as calcium carbonate and a glass fiber.

Herein, the decomposition with subcritical water can be carried out in the presence of water containing an inorganic compound comprising hydroxyl groups, which has 2 or more valences.

As described-above, the decomposition of the thermosetting resin-containing composition with subcritical water, in the presence of water containing an inorganic compound comprising hydroxyl groups, which has 2 or more valences, produces a styrene-fumaric acid copolymer in a form of a salt of a carboxylic acid as a water-insoluble component, which can be precipitated. The resulting styrene-fumaric acid copolymer can be separated off as a solid together with the inorganic materials originally contained in the thermosetting resin-containing composition as well as undecomposed thermosetting resin. Furthermore, after the decomposition, the resulted monomers derived from the polyester moiety of the thermosetting resin, such as a polyalcohol and a polybasic acid, are water-soluble components, which can be separated off from the solid comprising the styrene-fumaric acid copolymer as a salt of a carboxyl acid, etc.

FIG. 2 describes the decomposition of the thermosetting resin-containing composition with subcritical water, which composition comprises a thermosetting resin comprising a polyester moiety and a crosslinking moiety therewith, calcium carbonate and a glass fiber. In the presence of water free of any inorganic compound comprising hydroxyl groups, the decomposition of the thermosetting resin-containing composition free of calcium carbonate as an inorganic material with the subcritical water can produce a water-insoluble styrene-fumaric acid copolymer, as shown in FIG. 3 (b), which is described in detail hereinafter. In this case, the treatment of the following step (D) described hereinafter can be omitted. Furthermore, the resulting solid in the following step (B) described hereinafter does not comprise calcium carbonate and any inorganic compound comprising hydroxyl groups. Therefore, in this case, the treatment of the following step (C) described hereinafter can be omitted. Accordingly, the treatment of the following step (E) described hereinafter can follow directly after the treatment of the step (A).

The following step (B), as it is also described in FIG. 2, comprises a step of subjecting the resulted decomposed products to a solid-liquid separation to provide a solid comprising a styrene-fumaric acid copolymer as a salt of a carboxylic acid.

Specifically, a reaction vessel comprising the subcritical water and the decomposed products is cooled. The contents of the reaction vessel are subjected to a solid-liquid separation such as a filtration, etc. The styrene-fumaric acid copolymer as a salt of a carboxylic acid can be separated off as a solid (phase) with the inorganic materials, such as calcium carbonate, the glass fiber, and the like, which are originally comprised in the thermosetting resin-containing composition, and the undecomposed thermosetting resin, etc.

Herein, the liquid phase of the aqueous solution comprising monomer components such as a polyalcohol(s) and a polybasic acid(s) in their dissolved states can be separated off. The liquid phase comprising the polyalcohol and the polybasic acid can be recycled or used, as water to be reached to the subcritical state, in order to decompose the thermosetting resin with the subcritical water. The liquid phase comprising the polyalcohol and the polybasic acid can be repeatedly recycled and used. Each of decompositions can produce the polyalcohol(s) and polybasic acid(s) which can be dissolved into the aqueous solution in each case. Herein, the concentrations of the resulting polyalcohol and polybasic acid are increased. Therefore, the polyalcohol and polybasic acid can be obtained in their high concentrations.

The following step (C), as it is also described in FIG. 2, comprises a step of adding aerated water (carbonic acid gas and water) to the solid phase obtained in the step (B) to dissolve the calcium carbonate contained in the solid phase into water to produce the solid comprising a styrene-fumaric acid copolymer as a salt of a carboxylic acid, which can be collected.

Specifically, to a vessel, water and the solid in a mixture of the inorganic materials such as calcium carbonate and glass fiber, and the styrene-fumaric acid copolymer are added. The vessel is closed. Carbonic acid gas ($CO_2$) is introduced into the closed vessel to transform the calcium carbonate to calcium hydrogencarbonate which can be dissolved into water. Subsequently, the vessel is opened and the contents of the vessel are subjected to a solid-liquid separation such as a filtration, etc. The solid-liquid separation provides a solid comprising a glass fiber and a styrene-fumaric acid copolymer in a form of a salt of a carboxylic acid as well as water comprising dissolved calcium hydrogencarbonate derived from the calcium carbonate. The calcium hydrogencarbonate-containing water is heated to produce carbon dioxide ($CO_2$), which is separated off, and then precipitate calcium carbonate, which can be separated off from the water. The resulting calcium carbonate can be recycled or used as an inorganic filler again. The resulting carbon dioxide and water can be recycled or repeatedly used as aerated water to be added to in the step (C).

Herein, in the step (A), when a thermosetting resin-containing composition comprising calcium carbonate as an inorganic material is subjected to the decomposition with subcritical water in the presence of water comprising an inorganic compound comprising hydroxyl groups, which has 2 or more valences, such as calcium hydroxide, the solid resulted in the step (B) comprises the inorganic compound comprising hydroxyl groups, which has 2 or more valences. In order to collect the solid comprising the styrene-fumaric acid copolymer in a form of a salt of a carboxylic acid, the inorganic compound comprising hydroxyl groups is essentially to be dissolved into water. In the step (C), aerated water (carbonic acid gas and water) is added to the solid obtained in the step (B) to allow the calcium carbonate contained in the solid to be dissolved into water. Simultaneously, the inorganic compound comprising hydroxyl groups can be dissolved into water. Whereas, in the step (A), when a thermosetting resin-containing composition free of calcium carbonate as an inorganic material is subjected to the decomposition with subcritical water in the presence of water comprising an inorganic compound comprising hydroxyl groups, which has 2 or more valences, such as calcium hydroxide, the solid resulted in the step (B) also comprises the inorganic compound comprising hydroxyl groups, which has 2 or more valences. In this case, the solid resulted in the step (B) is free of calcium carbonate. The solid resulted in the step (B), however, comprises the inorganic compound comprising hydroxyl groups, which has 2 or more valences. Therefore, aerated water is essentially added to dissolve the inorganic compound into water.

The following step (D), as it is also shown in FIG. 2, comprises a step of addition of a mixture of water and an acid such as hydrochloric acid to the solid obtained in the step (C) to transform the styrene-fumaric acid copolymer in a form of a salt of a carboxylic acid to a styrene-fumaric acid copolymer itself (i.e., in a form of a carboxylic acid).

The styrene-fumaric acid copolymer in a form of a salt of a carboxylic acid present in the solid obtained in the step (C) comprises a styrene residue and a fumaric acid residue, which are shown in FIG. 3(a), wherein one carboxyl group is linked with the other carboxyl group via a metal M to form a linkage: —COO-M-OOC—. Such styrene-fumaric acid copolymer in the linked form is water-insoluble, and has a poor solubility to the solvent which is described hereinafter in detail. Therefore, as it is shown in FIG. 3(b), an acid such as hydrochloric acid is added to such styrene-fumaric acid copolymer to cleave the linkage via the metal M having 2 or more valences (i.e., —COO-M-OOC—) to leave a styrene-fumaric acid copolymer having a carboxyl group, which can be dissolved into the solvent.

The following step (E) comprises a step of addition of a hydrophobic solvent having a higher solubility which can dissolve the styrene-fumaric acid copolymer than that of water to the mixture of water and the solid comprising the styrene-fumaric acid copolymer obtained in the step (D). Subsequently, the mixture is heated to allow the styrene-fumaric acid copolymer in the solid to be dissolved into the hydrophobic solvent, which can be collected, separated or isolated from the hydrophobic solvent.

Specifically, as it is also shown in FIG. 2, octanol is added to the mixture of the above-described solid and water (containing the acid). The mixture is headed to a temperature with avoiding evaporation of water, for example, within a range of from 50° C. to 90° C. to allow the styrene-fumaric acid copolymer therein to be dissolved into octanol. Herein, octanol is hydrophobic. Therefore, addition of octanol to the mixture of water and the above-described solid provides 2 phases consisting of the octanol phase and the aqueous phase, wherein the styrene-fumaric acid copolymer is dissolved in the octanol phase. Therefore, the octanol phase in which the styrene-fumaric acid copolymer is dissolved is separated off, and then the styrene-fumaric acid copolymer can be collected, separated or isolated from the octanol.

Herein, with respect to the obtained octanol phase, this octanol phase is heated to a temperature no more than the boiling point of octanol, for example, within a range of from 100° C. to 195° C., preferably within a range of from 150° C. to 195° C. to produce an octylated styrene-fumaric acid copolymer. Furthermore, when the octanol phase is heated to a temperature no less than the boiling point of octanol, octanol can be further reacted with the styrene-fumaric acid copolymer to from an octylated styrene-fumaric acid copolymer, and then the excess amount of octanol can be evaporated off to leave the octylated styrene-fumaric acid copolymer which can be collect as a solid. The octylated styrene-fumaric acid copolymer can be recycled and used as an alternate of a polystyrene, since the octylated styrene-fumaric acid copolymer has properties similar to those of polystyrene, but structures are different from each other. The evaporated octanol can be recycled and used as the hydrophobic solvent in the step (E).

In the step (E), such removal of the octanol phase wherein the styrene-fumaric acid copolymer is dissolved can leave an aqueous phase and a solid such as a glass fiber. The solid can be collected by means of a method such as a filtration. The resulting filtrate can be recycled and used in the step (D), as a mixture of water and acid (i.e., aqueous acid solution), again, which can be added to the solid obtained in the step (C) to transform the styrene-fumaric acid copolymer in a form of a salt of a carboxyl acid to a styrene-fumaric acid copolymer itself, i.e., in a form of an carboxylic acid. If the concentrations of the salts in the solution are increased during repeatedly recycling, water can be evaporated off to lave the salts which can be collected. The evaporated water can be recycled and used again.

The present invention is further described in detail hereinafter with referring to the Examples of the invention, to which the present invention is not limited.

EXAMPLES

Production Example 1

Glycols of propylene glycol, neopentyl glycol and dipropylene glycol, and maleic anhydride in a stoichiometric molar amount to the glycols were subjected to a polycondensation to synthesize an unsaturated polyester resin. Styrene as a crosslinking agent was added to the (neat) varnish of the unsaturated polyester resin in a stoichiometric molar amount relative to the polyester resin to give a liquid resin. 165 Parts by weight of calcium carbonate and 90 parts by weight of glass fiber were added to 100 parts by weight of the liquid resin. The liquid resin was cured in a mold to give a molded unsaturated polyester resin product (hereinafter, which is referred to as "thermosetting resin"). The thermosetting resin was powdered wherein the particle size is about 2 mm or less.

Example 1

4 g of the thermosetting resin prepared in the Production Example 1 and 16 g of pure water were charged into a reaction tube. This tube was immersed in a bath equipped with a thermostat at a temperature of 260° C. Water was reached to the subcritical state. The tube was left in the bath for 4 hours to decompose the thermosetting resin. Subsequently, the reaction tube was taken off from the bath, and then immersed in a cooling bath. The reaction tube was rapidly cooled and then left to a room temperature. After this decomposition treatment, the reaction tube contained water-soluble components; water-insoluble decomposed resin components comprising styrene-fumaric acid copolymer; glass fiber; and calcium carbonate. The contents of the reaction tube were filtered to give the aqueous solution and the solid contents. The separated solid contents were collected.

Subsequently, 40 ml of an aqueous 1 mol/l hydrochloric acid solution (wherein HCl is present in an amount of 1.46 g) was added to 3.6 g of the collected solid contents to completely dissolve the calcium carbonate contained in the solid contents into water. The mixture was subjected to a solid-liquid separation with sufficient washing to give a solid residue. Herein, 1.36 g of HCl was required to completely dissolve the calcium carbonate in this thermosetting resin into water.

1-Octanol (having boiling point of 195° C.) was added to the solid residue, wherein about 14 g of 1-octanol was added, which was 20 times of the theoretical weight of the styrene-fumaric acid copolymer contained in the thermosetting resin. The mixture was stirred for 8 hours with heating at 195° C.

Subsequently, the mixture was subjected to a solid-liquid separation to give 1-octanol phase. The excess amount of 1-octanol was evaporated off to give modified styrene-fumaric acid copolymer, which weight was measured. The collection yield was calculated according to the following equation.

Collection Yield(%)=[Weight of the styrene-fumaric acid copolymer eluted into the solvent (with the proviso that it is measured after evaporation of the solvent)]/[Theoretical weight of the styrene-fumaric acid copolymer contained in the thermo-setting resin]×100

Herein, the "theoretical weight of the styrene-fumaric acid copolymer contained in the thermosetting resin" was calculated as follows.

The solid resulted from the decomposition of the thermosetting resin with subcritical water was subjected to an acid treatment with hydrochloric acid to dissolve the calcium carbonate into water. The resulted mixture was subjected to a solid-liquid separation to give a solid residue. Acetone was added to the solid residue to allow the resulting styrene-fumaric acid copolymer (having a terminal carboxyl group) to be extracted/eluted into acetone. The acetone solution was separated off by a solid-liquid separation. Acetone was evaporated off at an ambient temperature from the acetone solution to give the styrene-fumaric acid copolymer (having a terminal carboxyl group). The structure of the styrene-fumaric acid copolymer was analyzed by NMR. Molar ratio of the styrene residues to the fumaric acid residues in the styrene-fumaric acid copolymer as a decomposed product was calculated and determined based on the results of the NMR structural analysis. The theoretical weight of the styrene-fumaric acid copolymer could be determined according to the above-described calculation for the "theoretical weight of Compound X" wherein the found molar ratio and the weight of the styrene as the crosslinking agent employed to prepare the thermosetting resin were assigned.

For example, in the Example 1, 0.48 g of styrene was used to prepare 4 g of the thermosetting resin. The molar ratio of the styrene residues to the fumaric acid residue in the styrene-fumaric acid copolymer was 2.2:1 (=styrene residues:fumaric acid residues). Accordingly, the theoretical weight of the styrene-fumaric acid copolymer contained in the thermosetting resin was 0.72 (g).

According to the above-described procedures, 30 g of thus obtained modified styrene-fumaric acid copolymer was dissolved into 70 g of styrene to give a 30% solution of the modified styrene-fumaric acid copolymer (i.e., the 30% solution was a shrinkage inhibitor).

Subsequently, approximately stoichiometric amount of styrene was added to the varnish of the unsaturated polyester resin, which was employed to prepare the thermosetting resin to be decomposed with subcritical water. Calcium carbonate was added to the mixture to give a formulation (varnish/styrene/calcium carbonate). The shrinkage inhibitor is added to the formulation wherein 10 parts by weight of the shrinkage inhibitor was contained. The formulation was poured into a mould, and then cured to form a moulded article.

Example 2

According to the Example 1, 4 g of the thermosetting resin was decomposed with subcritical water in the presence of 16 g of an aqueous calcium hydroxide solution (in 1 mol/l) instead of the pure water employed in the Example 1 under the similar conditions to those of the Example 1 to give the modified styrene-fumaric acid copolymer.

According to the Example 1, the modified styrene-fumaric acid copolymer was used as a shrinkage inhibitor to form a cured molded article in a similar formulation to that of the Example 1.

Example 3

According to the Example 1, instead of 1-octanol employed in the Example 1, acetone was added to the solid residue after the treatment with hydrochloric acid. The mixture was stirred for 8 hours at ambient temperature, and then, the mixture was subjected to a solid-liquid separation to give a solid content. Acetone in the solid content was forced to be evaporated off to cause an anhydrization therein to provide a modified styrene-fumaric acid copolymer.

According to the Example 1, the modified styrene-fumaric acid copolymer was used as a shrinkage inhibitor to form a cured molded article in a similar formulation to that of the Example 1.

Example 4

According to the Example 1, 1-octanol was added to the solid residue after the treatment with hydrochloric acid. Subsequently, the mixture was poured into a pressure vessel. The mixture was pressured at 170° C. (and at 0.7 MPa) for 4 hours, wherein the styrene-fumaric acid copolymer was facilitated to be dissolved into 1-octanol and modified with 1-octanol. Unreacted octanol was evaporated off to give the modified styrene-fumaric acid copolymer.

According to the Example 1, the modified styrene-fumaric acid copolymer was used as a shrinkage inhibitor to form a cured moulded article in a similar formulation to that of the Example 1.

Reference Example 1

According to the Example 1, the formulation (varnish/styrene/calcium carbonate), which was employed in the Example 1, without any shrinkage inhibitor, was used to produce a cured article.

Reference Example 2

According to the Example 1, a 30% solution of polystyrene, as a commercially available shrinkage inhibitor, in styrene was added to the formulation (varnish/styrene/calcium carbonate), which was employed in the Example 1, wherein 10 parts by weight of the shrinkage inhibitor was contained. The formulation was moulded to produce a cured article.

Shrinkage (%) on each of the cured articles produced in the Examples 1-4 and the Reference Examples 1 and 2 were determined as follows. Herein, appearance of the cured article was visually observed and evaluated.

The shrinkage (%) was calculated from the differences in sizes of the cured product which was produced in a mould (100 mm×100 mm×100 mm) with the resin having the above-described formulation.

The results are shown in Table 1.

TABLE 1

| | Yield of modified styrene-fumaric acid copolymer (%) | Shrinkage (%) | Evaluation of appearance |
|---|---|---|---|
| Ex. 1 | 78 | 0.3 | Excellent |
| Ex. 2 | 95 | 0.3 | Excellent |
| Ex. 3 | 40 | 0.5 | Excellent |
| Ex. 4 | 92 | 0.3 | Excellent |
| Ex. 1 (Ref.) | — | 4.0 | Terribly Rough |
| Ex. 2 (Ref.) | — | 0.2 | Excellent |

The results are shown in Table 1. Although yields (%) of the modified styrene-fumaric acid copolymers of the Examples 1-4 are varied, the evaluation results on their appearance are excellent in the Examples 1-4. It is confirmed that, in view of the shrinkage (%) in Table 1, the modified styrene-fumaric acid copolymers of the Examples 1-4 can act as shrinkage inhibitors. It is also found that the shrinkage (%) resulted from the present invention has no significant difference from that resulted from the commercially available shrinkage inhibitor used in the Reference Example 2. The Reference Example 1 shows terrible roughness on its surface appearance evaluation and 4.0% of the increased shrinkage. It means that shrinkage during the curing of the resin is remarkable in the Reference Example 1. In the Reference Example 1, wherein no shrinking inhibitor is employed, the properties of the resin may be deteriorated.

As described above, it is confirmed that the modified styrene-fumaric acid copolymer resulted from the decomposition of the thermosetting resin can be recycled and reusable, as a shrinkage inhibitor, in the moulding of the resin.

Production Example 2

Glycols of propylene glycol, neopentyl glycol and dipropylene glycol, and maleic anhydride in a stoichiometric molar amount to the glycols were subjected to a polycondensation to synthesize an unsaturated polyester. Styrene as a crosslinking agent was added to the (neat) varnish of the unsaturated polyester in a stoichiometric molar amount relative to the polyester to give a liquid resin. 165 Parts by weight of calcium carbonate and 90 parts by weight of glass fiber were added to 100 parts by weight of the liquid resin. The liquid resin was cured in a mold to give a molded unsaturated polyester resin product (hereinafter, which is referred to as "thermosetting resin").

Example 5

4 g of the thermosetting resin prepared in the Production Example 2, 16 g of pure water, and 0.95 g of calcium hydroxyde were charged into a reaction tube. This tube was immersed in a bath equipped with a thermostat at a temperature of 260° C. The pure water was reached to the subcritical state in the reaction tube. The tube was left in the bath for 4 hours to decompose the thermosetting resin.

Subsequently, the reaction tube was taken off from the bath, and then immersed in a cooling bath. The reaction tube was rapidly cooled and then left to a room temperature. After the decomposition treatment, the reaction tube contained water-soluble components; water-insoluble components comprising decomposed resin components; calcium carbonate; and glass fiber. The contents of the reaction tube were filtered to give 3.6 g of the solid contents. The separated solid contents were collected.

Subsequently, 40 ml of 1.0 N hydrochloric acid aqueous solution was added to the solid contents to react with the calcium attached to the carboxyl group of the styrene-fumaric acid copolymer in the water-insoluble components in order to cleave the linkage. 10 ml of octanol was added to the mixture. The mixture was heated to 60° C. to allow the styrene-fumaric acid copolymer in a form of a solid to be dissolved into the octanol. The octanol phase was separated off to leave water and solid phases.

Subsequently, the obtained octanol phase was heated to 180° C. to give an octylated styrene-fumaric acid copolymer. The heating temperature was further increased to give 1.1 g of the octylated styrene-fumaric acid copolymer as a solid, which was collected.

The invention claimed is:

1. A method for decomposing, in the presence of subcritical water, a thermosetting resin comprising a polyester moiety and a crosslinking moiety therewith to provide a compound comprising an acid residue derived from the polyester moiety and a residue derived from the crosslinking moiety, and collecting the compound, which comprises:
    (I) decomposing the thermosetting resin in the presence of subcritical water to provide a solid comprising a compound comprising an acid residue derived from the polyester moiety and a residue derived from the crosslinking moiety, the subcritical water being substantially free of an alkali metal hydroxide,
    (II) subjecting the solid to an organic solvent to dissolve the compound into the organic solvent, wherein the organic solvent has a higher solubility which can dissolve the compound than that of water, and
    (III) collecting, separating or isolating the compound from the organic solvent,
    wherein the decomposition is carried out in the presence of subcritical water containing calcium hydroxide, and
    wherein the method further comprises, prior to (II), treating, with an acid the solid containing compound comprising an acid residue derived from the polyester moiety and a residue derived from the crosslinking moiety.

2. The method according to claim 1, wherein the thermosetting resin comprising a polyester moiety and a crosslinking moiety therewith is free of calcium carbonate.

3. The method according to claim 1, wherein the organic solvent comprises an alcohol which is a liquid at ambient temperature, and wherein the method further comprises esterification, wherein the compound comprising an acid residue derived from the polyester moiety and a residue derived from the crosslinking moiety is esterified, with the alcohol, at the acid residue derived from the polyester moiety to allow the compound to be hydrophobic.

4. The method according to claim 3, wherein the alcohol comprises an alcohol having a higher boiling point than that of water.

5. The method according to claim 1, which further comprises anhydrization, wherein the compound comprising an acid residue derived from the polyester moiety and a residue derived from the crosslinking moiety is subjected to an anhydrization at the acid residue derived from the polyester moiety to allow the compound to be hydrophobic.

6. The method according to claim 5, wherein the anhydrization is carried out by subjecting a carboxyl group in the compound to a dehydration with heating.

7. The method according to claim 5, wherein the anhydrization is carried out by a reaction of a carboxyl group in the compound comprising an acid residue derived from the polyester moiety and a residue derived from the crosslinking moiety with acetic anhydride.

8. The method according to claim 1, wherein the solid containing the compound comprising an acid residue derived from the polyester moiety and a residue derived from the crosslinking moiety is subjected to a pressure up to 10 atm (in absolute pressure) and heating below the thermal decomposition temperature of the compound to allow the compound to be dissolved into the organic solvent.

* * * * *